(12) United States Patent
Wooldridge et al.

(10) Patent No.: US 10,527,411 B2
(45) Date of Patent: Jan. 7, 2020

(54) BRAKING SYSTEM

(71) Applicant: RENISHAW PLC, Wotton-under-Edge, Gloucestershire (GB)

(72) Inventors: Michael John Wooldridge, Stroud (GB); Jack Colebrooke, Bristol (GB); Kevin Cullivan, Rush (IE)

(73) Assignee: RENISHAW PLC, Wotton-under-Edge (GB)

( * ) Notice: Subject to any disclaimer, the term of this patent is extended or adjusted under 35 U.S.C. 154(b) by 0 days.

(21) Appl. No.: 15/750,473

(22) PCT Filed: Aug. 26, 2016

(86) PCT No.: PCT/GB2016/052673
§ 371 (c)(1),
(2) Date: Feb. 5, 2018

(87) PCT Pub. No.: WO2017/033030
PCT Pub. Date: Mar. 2, 2017

(65) Prior Publication Data
US 2018/0224272 A1    Aug. 9, 2018

(30) Foreign Application Priority Data
Aug. 26, 2015    (GB) .................................. 1515171.5

(51) Int. Cl.
*G01B 21/04*    (2006.01)
*F16D 65/14*    (2006.01)
*F16D 121/20*   (2012.01)

(52) U.S. Cl.
CPC ............ *G01B 21/047* (2013.01); *F16D 65/14* (2013.01); *F16D 2121/20* (2013.01)

(58) Field of Classification Search
CPC .... F16D 65/14; F16D 2121/20; G01B 21/047
See application file for complete search history.

(56) References Cited

U.S. PATENT DOCUMENTS 3,558,997 A * 1/1971 Derc ................... H02P 29/0016
188/158
3,730,317 A * 5/1973 Jaeschke ................ F16D 27/06
188/163

(Continued)

FOREIGN PATENT DOCUMENTS

CN    102214980 A    10/2011
CN    104295641 A    1/2015

(Continued)

OTHER PUBLICATIONS

"Electropermanent magnet," Wikipedia, retrieved Nov. 13, 2014, [http://en.wikipedia.org/wiki/Electropermanent_magnet].

(Continued)

*Primary Examiner* — Bradley T King
*Assistant Examiner* — James K Hsiao
(74) *Attorney, Agent, or Firm* — Oliff PLC

(57) ABSTRACT

An electro-magnetic brake which is switched between an operative braking position and an inoperative position by transient pulses of current. It is held passively in the operative and inoperative positions with little or no current. This prevents the generation of heat, which would affect the accuracy of measurements where the brake is used in dimensional measuring equipment. In one form, permanent and semi-permanent magnets are arranged in parallel, and the magnetic polarity of the arrangement is flipped by transient current pulses in a surrounding coil. A capacitor may provide a reservoir of current to activate the brake in the event of a power supply failure.

18 Claims, 6 Drawing Sheets

(56) References Cited

U.S. PATENT DOCUMENTS

| | | | |
|---|---|---|---|
| 3,763,968 A * | 10/1973 | Noly | F16D 55/02 |
| | | | 188/171 |
| 3,818,596 A | 6/1974 | Stemple et al. | |
| 4,237,439 A * | 12/1980 | Nemoto | G03B 17/38 |
| | | | 335/179 |
| 4,283,657 A | 8/1981 | Gordon et al. | |
| 5,813,287 A | 9/1998 | McMurtry et al. | |
| 6,104,270 A | 8/2000 | Elias | |
| 6,471,017 B1 | 10/2002 | Booz et al. | |
| 7,401,483 B2 * | 7/2008 | Dimig | E05B 81/00 |
| | | | 335/285 |
| 7,969,705 B2 * | 6/2011 | Dimig | H01F 7/04 |
| | | | 361/143 |
| 9,297,430 B2 * | 3/2016 | Drennen | F16D 49/02 |
| 9,586,678 B2 * | 3/2017 | Drennen | B60T 13/741 |
| 2008/0016977 A1 * | 1/2008 | Hsieh | E05F 1/006 |
| | | | 74/473.16 |
| 2010/0329427 A1 | 12/2010 | Takae et al. | |
| 2016/0015342 A1 | 1/2016 | Okuno | |

FOREIGN PATENT DOCUMENTS

| | | |
|---|---|---|
| DE | 3434116 A1 | 3/1986 |
| DE | 196 28 289 A1 | 2/1997 |
| DE | 197 52 543 A1 | 6/1999 |
| EP | 1 801 535 A2 | 6/2007 |
| GB | 945049 A | 12/1963 |
| GB | 1 203 189 A | 8/1970 |
| GB | 1274954 A | 5/1972 |
| JP | 01303331 A * 12/1989 ............. F16D 65/14 |
| WO | 03/006837 A1 | 1/2003 |
| WO | 2004/063579 A1 | 7/2004 |
| WO | 2006/037986 A2 | 4/2006 |
| WO | 2009/104656 A1 | 8/2009 |
| WO | 2014/132362 A1 | 9/2014 |

OTHER PUBLICATIONS

"Electropermanent Magnets," Qianhao Mechanical & Electrical, retrieved Nov. 13, 2014, [http://www.electropermanentmagnets.com].

Jan. 29, 2016 Search Report issued in British Patent Application No. 1515171.5.

Nov. 3, 2016 International Search Report issued in International Patent Application No. PCT/GB2016/052673.

Nov. 3, 2016 Written Opinion of the International Searching Authority issued in International Patent Application No. PCT/GB2016/052673.

* cited by examiner

BRAKING SYSTEM

FIELD OF THE INVENTION

This invention relates to braking systems.

DESCRIPTION OF PRIOR ART

One example where the use of a braking system may be desired is in position determining apparatus, e.g. for dimensional metrology. Such a position determining apparatus may comprise a movable member for holding a probe or other tool, which is movable in one, two or three dimensions relative to a fixed member or base in order to perform measurement or other operations on a workpiece. The movement may be driven by a motor or motors, or manually.

Examples of such position determining apparatus include coordinate measuring machines (CMM), comparative gauging machines, machine tools, manual coordinate measuring arms and robots. The apparatus may be a so-called Cartesian machine, in which the movable member supporting the probe or other tool is mounted via three serially-connected carriages which are respectively movable in three orthogonal directions X,Y,Z. This is an example of a "serial kinematic" motion system. Alternatively, the measuring apparatus may be a non-Cartesian machine, for example having a "parallel kinematic" motion system comprising three or six extensible struts which are each connected in parallel between the movable member and the relatively fixed member or base. The motion of the movable member (and thus the probe or tool) in the X,Y,Z working volume is then controlled by coordinating the respective extensions of the three or six struts. An example of a non-Cartesian machine is shown in International Patent Applications WO 03/006837 and WO 2004/063579.

Such apparatus may be provided with a braking system to prevent motion of the movable member when not in use. For example, this may prevent it sinking under gravity. In some circumstances it may also be important to apply the braking system to arrest the motion in a fail-safe manner, for example in the event of a power failure. This may prevent the movable member (or its probe or tool) crashing into something or someone, possibly causing damage or injury.

Braking systems for other types of apparatus are known, in which a biasing force is applied to a braking element by a passive element such as a permanent magnet or a spring, to bias the braking element into an operative braking position. To release the braking element, an active element such as an electromagnetic coil is energised, counteracting the biasing force of the passive element. This provides fail-safe operation, since if the power to the active element fails then the passive element re-applies the biasing force to the braking element and the apparatus is braked. An example is shown in International Patent Application No. WO 2014/132362 (which is related to US Patent Application No. US 2016/0015342, published later on 21 Jan. 2016).

However, such arrangements require the active element (e.g. electromagnetic coil) to be energised at all times while the apparatus is in use. In the case of a position determining apparatus, this may cause thermal growth of parts of the apparatus. Such thermal growth adversely affects the accuracy of dimensional metrology. Continuous energisation is also a problem if energy efficiency is important, for example in battery-powered equipment such as portable measuring apparatus.

SUMMARY OF THE INVENTION

The present invention provides a braking system for braking a movable member, comprising:

a braking element having an operative braking position in which it applies a braking force to the movable member, and an inoperative position in which the braking force is released; and an electrically-operated device arranged to switch the braking element between the operative and inoperative positions;

characterised in that the electrically-operated device comprises:

one or more active elements which are energisable by a transient pulse of electrical current to switch the braking element from the operative braking position to the inoperative position and from the inoperative position to the operative braking position; and one or more passive elements which maintain the braking element in the operative braking position and in the inoperative position, after the transient pulse has been removed from the active element or elements.

At least in the preferred embodiments, this avoids or reduces the need for continuous energisation to hold the braking element in the inoperative position during normal movement of the movable member. Possible advantages which result may include a limitation of thermal growth and/or increased energy efficiency.

The electrically-operated device may be electro-magnetic, in which case its electro-magnetic force may be arranged to act on the braking element to switch it between the operative and inoperative positions. And/or the electrically-operated device may be coupled to the braking element mechanically.

In one preferred embodiment, the braking device comprises an energy storage device (such as a capacitor) configured to supply the transient pulse to one or more of the active elements in the event of a power supply failure, to switch the braking element from the inoperative position to the operative braking position. This may provide fail-safe operation to brake the movement of the movable member in the event of a power supply failure. For example, the energy storage device may be a capacitor.

Preferably, in the inoperative position, the one or more active elements are not energised. However, they may be energised by a current which is less than the transient pulse of electrical current.

The one or more passive elements may include one or more magnets. The magnet may be a soft permanent magnet the magnetic polarity of which is switchable by applying the transient pulse to one or more of the active elements. The one or more active elements may include an electromagnetic coil associated with the soft permanent magnet. The braking device may further include a hard permanent magnet, wherein the magnetic polarity of the soft magnet is switchable by the transient pulse between a state of alignment with and a state of opposition to the magnetic polarity of the hard magnet.

In other embodiments, the one or more passive elements may include a spring.

The electro-magnetic device may be bistable or may include a bistable mechanism, whereby it is stable in both the operative and inoperative braking positions.

BRIEF DESCRIPTION OF THE DRAWINGS

Preferred embodiments of the invention will now be described by way of example, with reference to the accompanying drawings, wherein.

DESCRIPTION OF PREFERRED EMBODIMENTS

Figure 1:
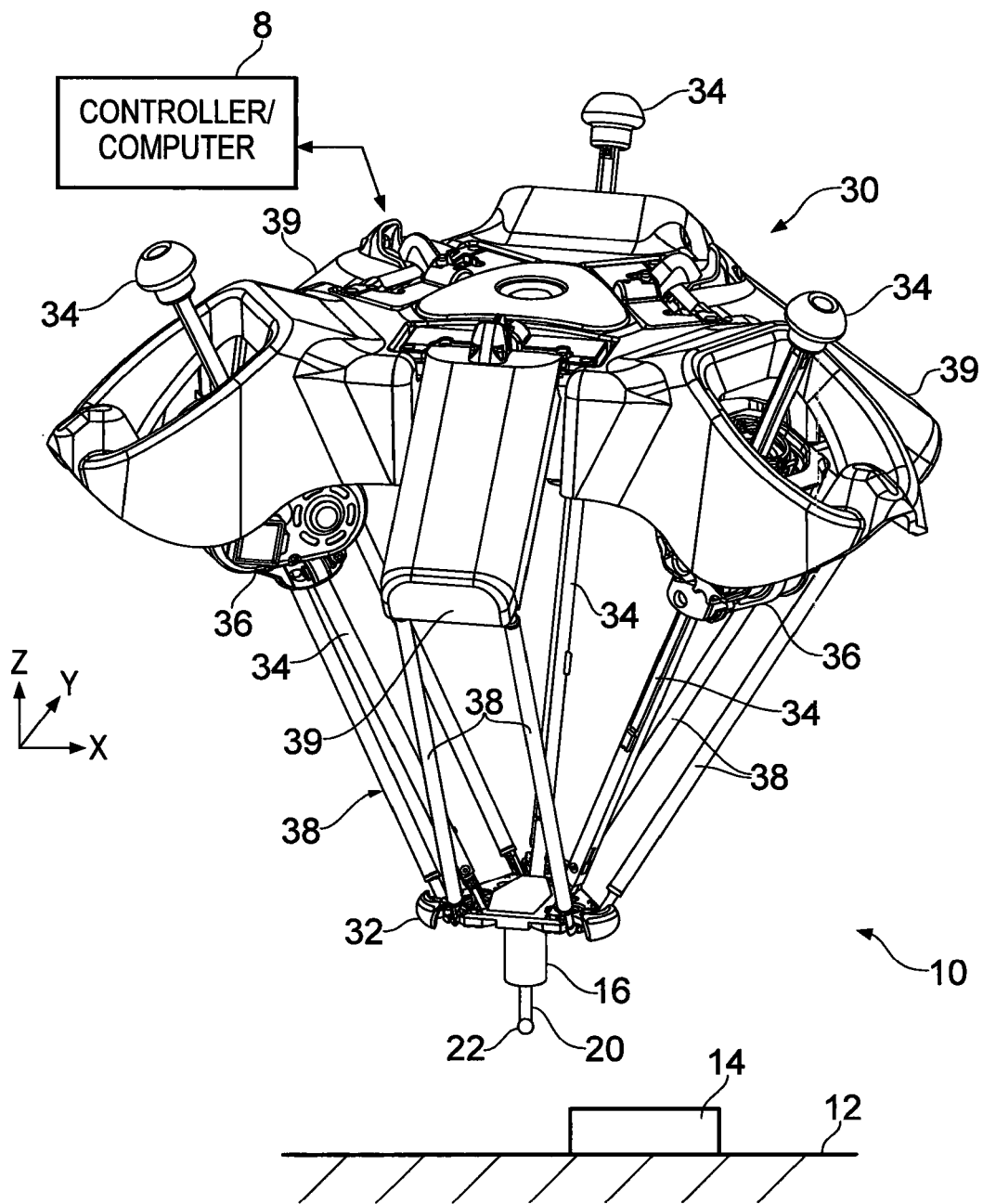
FIG. 1 shows operative parts of a comparative gauging machine with a motion system using parallel kinematics.

FIG. 1 is an illustration of parts of a coordinate measuring apparatus. The apparatus is a comparative gauging machine 10 as sold by the present applicants Renishaw plc under the trademark EQUATOR. It comprises a fixed platform 30 connected to a movable platform 32 by a non-Cartesian parallel kinematic motion system. In the present example, the parallel kinematic motion system comprises three struts 34 which act in parallel between the fixed and movable platforms. The three struts 34 pass through three respective actuators 36, by which they can be extended and retracted. One end of each strut 34 is mounted by a universally pivotable joint to the movable platform 32, and the actuators 36 are likewise universally pivotably mounted to the fixed platform 30.

The actuators 36 each comprise a motor for extending and retracting the respective strut, and a transducer which measures the extension of the respective strut 34. In each actuator 36, the transducer may be an encoder comprising a scale and readhead, with a counter for the output of the readhead. Each motor and transducer forms part of a respective servo loop controlled by a controller or computer 8. The motor may act through any suitable mechanism to extend and retract the strut, such as a rack and pinion. One preferred mechanism is a low-hysteresis drive with a toothed belt wrapped around a pinion on the motor spindle, for example in an Ω-shape maintained by an idler wheel or wheels.

The parallel kinematic motion system also comprises three passive anti-rotation devices 38, 39 which also act in parallel between the fixed and movable platforms. Each anti-rotation device comprises a rigid plate 39 hinged to the fixed platform 30 and a parallel, spaced pair of rods 38 which are universally pivotably connected between the rigid plate 39 and the movable platform 32. The anti-rotation devices cooperate to constrain the movable platform 32 against movement in all three rotational degrees of freedom. Therefore, the movable platform 32 is constrained to move only with three translational degrees of freedom X, Y, Z. By demanding appropriate extensions of the struts 34, the controller/computer 8 can produce any desired X, Y, Z displacement or X, Y, Z positioning of the movable platform.

The principle of operation of such a parallel kinematic motion system is described in our U.S. Pat. No. 5,813,287 (McMurtry et al). It is an example of a tripod mechanism (having the three extending struts 34). Other motion systems e.g. with tripod or hexapod parallel kinematic mechanisms can be used.

Taken together, the transducers of the three actuators form a position measuring system. This determines the X, Y, Z position of the movable platform 32 relative to the fixed platform 30, by appropriate calculations in the controller or computer 8. These calculations are known to the skilled person.

Typically an analogue probe 16 having a deflectable stylus 20 with a workpiece contacting tip 22 is mounted on the movable platform 32 of the machine, although other types of probes (including touch trigger probes) may be used. The machine moves the probe 16 relative to a workpiece 14 on a table 12 in order to carry out measurements of features of the workpiece. The X, Y, Z position of a point on the workpiece surface is derived by calculation from the transducers in the servo system, in conjunction with the outputs of the analogue probe 16. This is all controlled by the controller/computer 8. Alternatively, with a touch trigger probe, a signal indicating that the probe has contacted the surface of the workpiece freezes the X,Y,Z position value calculated from the output from the transducers and the computer takes a reading of the coordinates of the workpiece surface. If desired, for gauging operations during normal production use, automatic means such as a robot (not shown) may place each of a succession of substantially identical workpieces from a production run in at least nominally the same position and orientation on the table.

The parallel kinematic measuring apparatus of FIG. 1 is only one example of a type of apparatus in which the present invention can be used. Other examples include measuring apparatus with serial kinematic motion systems, such as a conventional Cartesian CMM with three serially-connected carriages which are movable orthogonally in XYZ directions. This could be computer controlled or manually operated. Another possible serial kinematic machine is an inspection robot or a manual articulating arm, with multiple articulating arm members connected serially by multiple rotary joints. The invention is also applicable to systems with linear motion in only one or two directions, and/or rotary motion about one or more axes.

Whichever type of machine is used, typically it is placed in a workshop environment in order to inspect production workpieces from an automated manufacturing process.

Figure 2:
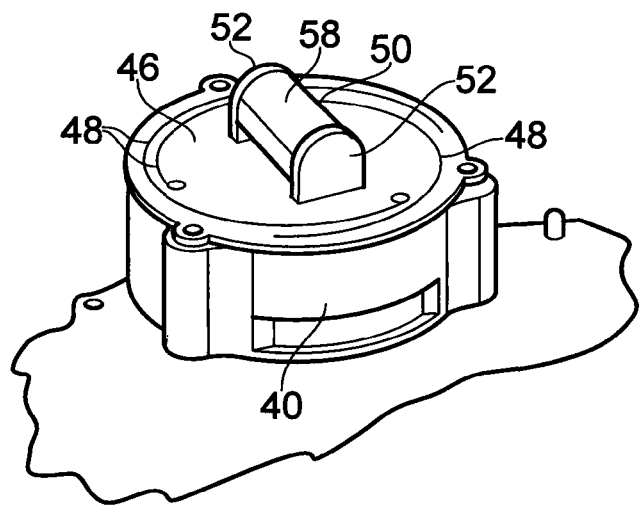
FIG. 2 is an isometric view of part of an actuator and braking system in the machine of FIG. 1.
Figure 3:
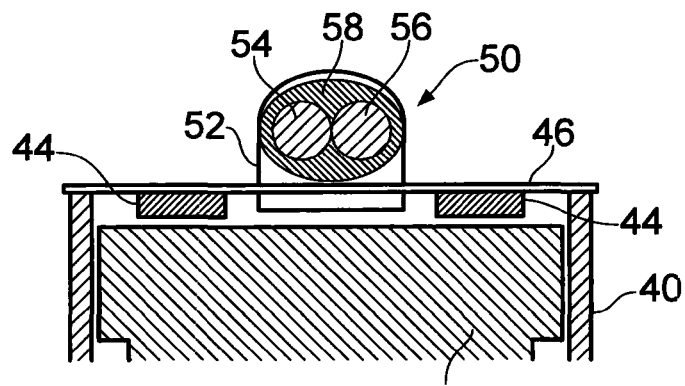
FIG. 3 is a cross-sectional view of FIG. 2.

FIGS. 2 and 3 show a braking system which is included within each of the actuators 36. The motor in the actuator has a rotor 42 mounted for rotation in a housing 40. A planar spring 46 is mounted on the end of the housing 40, and an annular brake pad 44 is mounted on one side of the planar spring, facing the rotor. The planar spring 46 has spiral cut-outs 48 so that the spring allows the brake pad to move axially towards and away from the rotor. In its normal relaxed state with no other forces acting, the planar spring 46 acts as a passive element which holds the brake pad 44 off the rotor 42, so that the motor is free to rotate, extending and retracting the strut 34.

An electropermanent magnet assembly 50 is mounted on the other side of the planar spring, opposite the rotor. It has two end plates 52, which extend through the planar spring to form a magnetic circuit with the rotor 42. When the electropermanent magnet applies a magnetic force as described below, the end plates are pulled axially towards the rotor, deflecting the planar spring, and causing the brake pad 44 to engage frictionally with the rotor 42, applying a braking force.

Figures 4, 5:
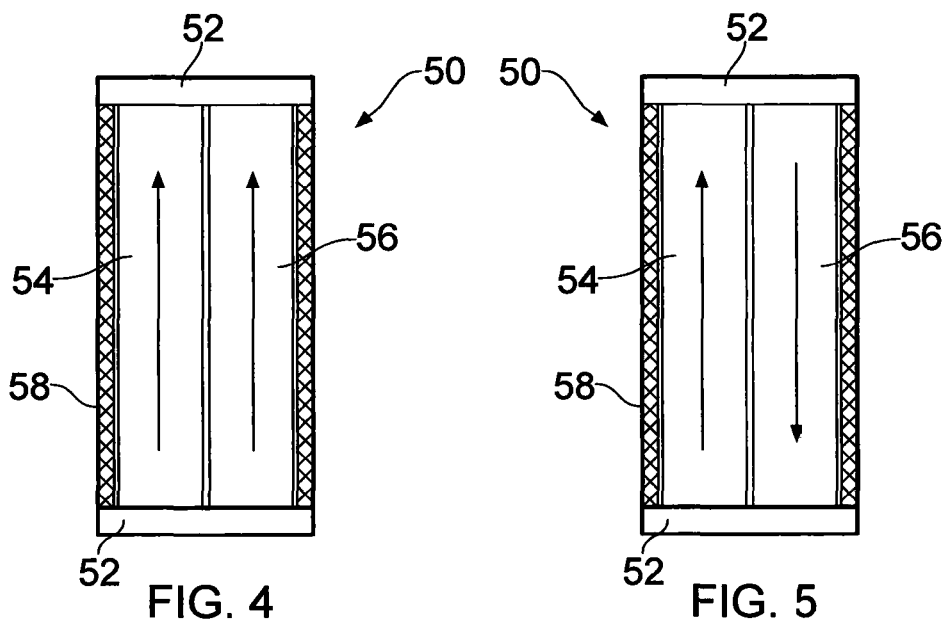
FIGS. 4 and 5 are diagrammatic representation of part of the braking system.

As seen in FIGS. 3, 4 and 5, the electropermanent magnet assembly 50 comprises a hard (permanent) magnet 54 and a soft (semi-permanent) magnet 56, arranged side-by-side in a parallel arrangement. They are surrounded by an electromagnetic coil 58, which forms an active element. In FIGS. 4 and 5, arrows indicate the magnetic polarities of the hard and soft magnets 54, 56. The hard magnet 54 may be made from a material such as sintered neodymium. The soft (semi-permanent) magnet 56 may be made of a material such as an AlNiCo alloy, with a coercivity chosen such that its magnetic polarity can be switched back and forth from one direction to the other by the application of a transient switching pulse (or activation pulse) of current through the coil 58. Its magnetic polarity then remains in the reversed state with no applied current, until the application of another transient switching pulse of current in the opposite sense switches it back again. Meanwhile, the magnetic polarity of the hard magnet 54 is unaffected by these current pulses.

FIGS. 4 and 5 show the two possible resulting bistable states of the electropermanent magnet assembly 50.

In FIG. 4, the polarities of the magnets 54, 56 are in a state of alignment and their magnetic forces reinforce each other. A magnetic circuit is formed through the end plates 52 and the rotor 42, pulling the brake pad 44 into frictional engagement with the rotor. The magnets 54, 56 then act as passive elements to apply the brake to prevent motion of the strut 34.

In FIG. 5, after the polarity of the soft magnet 56 has been switched by a pulse of current in the coil 58, the polarities of the two magnets 54, 56 are in a state of opposition to each other. The magnetic circuit remains within the assembly 50, passing from one magnet to the other via the end plates 52, but no longer passing through the rotor 42. In this state, the brake is released, as the planar spring 46 passively holds the brake pad 44 off the rotor 42.

Other arrangements are possible for the assembly 50. For example, the electromagnetic coil 58 could be wrapped around just the magnet 56 and not the magnet 54. And/or the hard and soft magnets 54, 56 could be arranged end-to-end instead of side-by-side, though this does not produce a preferred magnetic circuit when their polarities are in a state of opposition.

It is notable that a pulse of current is only required to switch the electropermanent magnet from one state to the other, but not to keep it in either state thereafter. This means that during normal use of the coordinate measuring apparatus, with the brake released, there is no continuous current flow which might cause thermal growth of the struts 34, causing an increase in their length and a resulting inaccuracy in the position of the probe 16. It also means that when the brake is applied, it can prevent movement even if there is a power failure.

However, in some applications these issues may not be so important, and so a smaller residual current may continue to flow after the transient switching pulse. For example, in a particular application there may be a continuous trickle current in the coil 58 if the heat produced is below that which would cause thermal growth sufficient to adversely affect the required accuracy of the apparatus.

Figure 6:
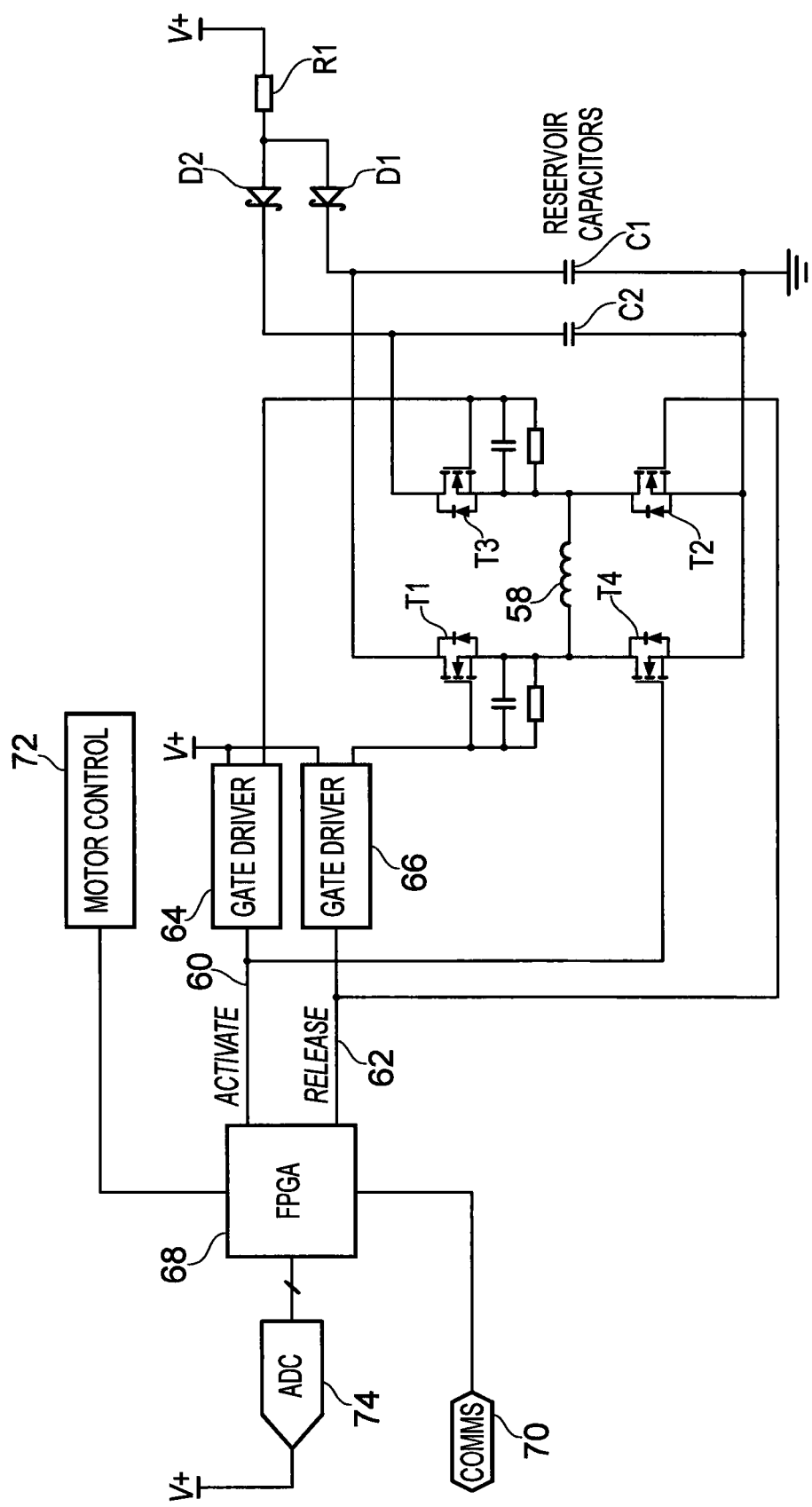
FIG. 6 is a schematic circuit diagram of a power supply circuit for the braking system.

FIG. 6 shows a circuit which provides the transient switching pulses of current to switch the electropermanent magnet assembly 50 between the two states seen in FIGS. 4 and 5. One of these circuits is provided for each of the three actuators 36.

The circuit includes a field programmable gate array (FPGA) 68. The FPGA 68 communicates (directly or through an intermediate master circuit) with the machine controller 8 via a communications bus 70, and enables or disables the motor in the respective actuator 36, via a motor control 72. In normal operation the FPGA is configured to act on commands from the controller 8, to release the respective brake when the motor is to be driven, and to activate the brake when the motor is stopped. Optionally it may also receive manual inputs, e.g. from an emergency stop button to switch off the motors and apply the brakes in the event of an emergency.

The FPGA 68 produces signals on a line 60 when the brake is to be activated, and on a line 62 when it is to be released. These signals drive the electromagnetic coil 58 through a drive bridge comprising transistors T1, T2, T3 and T4. Since the coil 58 uses a higher operating voltage than the FPGA, the signals to the high side transistors T1, T3 of the drive bridge pass though gate drivers 64, 66.

Power for the drive bridge comes from two reservoir capacitors C1, C2, which are trickle charged via a resistor R1 and respective Schottky diodes D1, D2. The capacitors each store a preset amount of energy when charged.

When a 'release' signal is received from the FPGA on the line 62, the transistors T1 and T2 are switched on and the capacitor C1 discharges through the coil 58. This produces a pulse of current in the coil, causing the soft magnet 56 to flip from the state shown in FIG. 4 to that shown in FIG. 5. The brake pad 44 is released from the rotor 42 of the motor. Normal unbraked operation of the machine 10 is possible.

After this transient switching pulse, the FPGA removes the 'release' signal from the line 60, transistors T1, T2 turn off and capacitor C1 recharges. As discussed above, no further current passes through the coil 58 during normal operation of the machine 10. So thermal growth of the struts 34 and other parts of the machine is avoided, and energy is conserved (which may be advantageous in battery operated apparatus).

When an 'activate' signal is received from the FPGA on the line 60, the transistors T3 and T4 are switched on and the capacitor C2 discharges through the coil 58, with current flow in the opposite sense. This produces another pulse of current in the coil, causing the soft magnet 56 to flip back from the state shown in FIG. 5 to that shown in FIG. 4. The end plates 52 are pulled towards the rotor 42, and the brake pad 44 is applied to brake the motion of the rotor 42. Again, after this transient switching pulse, the FPGA removes the 'activate' signal from the line 60, the transistors T3, T4 turn off and capacitor C2 recharges. No further current passes through the coil 58.

In the event of a power failure while the braking system is released, it is re-activated in a fail-safe manner as follows.

An analogue to digital converter (ADC) 74 monitors the power supply voltage V+ to the machine 10 (e.g. 48V and 20V), via a suitable voltage divider (not shown). The ADC 74 inputs a corresponding digital value to the FPGA 68. In the event of a power failure, the FPGA is programmed to issue an 'activate' signal on line 60 when this digital value falls below a certain threshold, e.g. corresponding to a predetermined voltage lower than V+ or 20V. It also signals the motor control 72 to disable the motor. The FPGA and ADC are able to do this since their own power supply is regulated at a lower voltage still, e.g. 3.3V. This all happens very quickly in the short time before the power supply V+ drops below 3.3V and the operation of the FPGA is disrupted.

Thus, in the event of a power failure, this 'activate' signal switches on the transistors T3 and T4. (The gate driver 64 includes a reservoir capacitor, not shown, which stores enough energy to switch on T3 as the power goes down). The capacitor C2 discharges through the coil 58 via T3 and T4, supplying a pulse of current sufficient to flip the soft magnet 56 to the state shown in FIG. 4 and activate the brake. Since no further current is required to maintain the soft magnet in the state shown in FIG. 4, this ensures the fail-safe operation, to halt the motion of the machine 10 and prevent it crashing.

Although the above circuit uses an ADC and FPGA to detect a power failure, the same functionality could be achieved using simpler electronics if desired, e.g. a comparator circuit monitoring the power supply voltage. However, the FPGA has the advantage that the voltage threshold at which the braking system is activated can be programmable.

Figure 7:
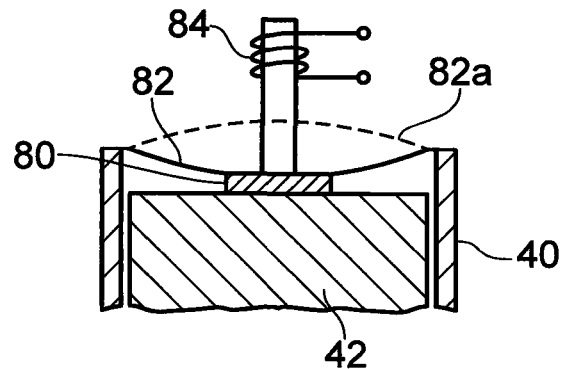
FIGS. 7, 8, 9 and 10 each show alternative braking systems to FIGS. 2 and 3.

FIG. 7 shows an alternative to the braking system of FIGS. 2 and 3. As before, a motor rotor 42 is mounted for rotation in a housing 40. A brake pad 80 is mounted on the underside of a planar spring 82. In this embodiment, the planar spring 82 is in the form of a bistable diaphragm. It acts as a passive element which can naturally adopt either of two buckled positions. In the position shown in solid lines, the spring 82 urges the brake pad 80 against the rotor 42, to brake the motion of the strut 34 of the machine. In the position indicated by a broken line 82a, the spring 82 holds the brake pad off the rotor 42, and the brake is released.

To activate the brake, the diaphragm spring is flipped into the position shown in solid lines by a transient switching pulse of current in a solenoid coil 84 (which forms an active element). To release the brake, it is flipped into the position indicated by the broken line 82a by another transient switching pulse of current in the coil 84, in the opposite sense. The diaphragm spring 82 thus enables the brake to be held in the activated or released condition without a continuous supply of power. The pulses of current to the coil 84 may be supplied by a fail-safe circuit such as in the previous embodiment, which ensures that the brake is activated in the event of a power supply failure.

Figure 8:
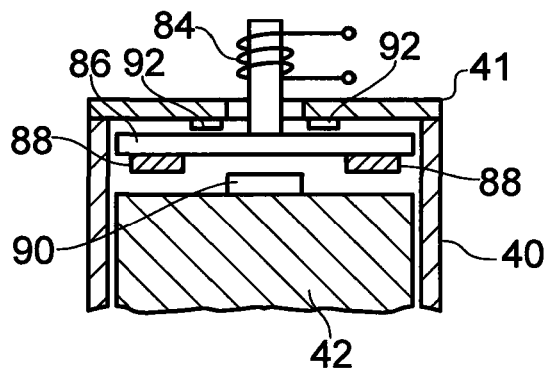

FIG. 8 shows a modified version of the FIG. 7 embodiment, in which similar parts have been given the same reference numbers. Instead of a diaphragm planar spring, it has a plate 86 of a magnetic material such as steel, which can be flipped between activated and released positions. One or more brake pads 88 are mounted to the underside of the plate 86. In the activated condition, one or more magnets 90 on the rotor 42 act as passive elements to attract the plate 86, urging the brake pads against the rotor. In the released condition, one or more magnets 92 on a cover 41 of the housing likewise act as passive elements to attract the plate 86, holding the pads away from the rotor. The plate 86 is flipped between the activated and released positions by transient switching pulses of current in a solenoid coil (in opposite directions), as in FIG. 7, with a similar fail-safe circuit to activate the brake if the power supply fails. This forms a bistable mechanism. Of course, instead of a steel plate, the magnets 90, 92 may act on magnetic inserts provided in a plate made of a non-magnetic material. Or the magnets may be mounted in or on the plate, acting on magnetic materials of the rotor 42 and the housing cover 41.

Figure 9:
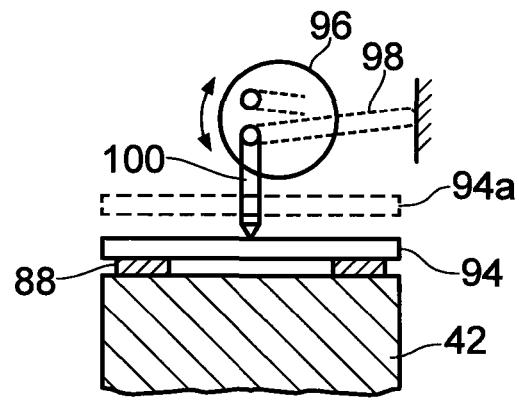

FIG. 9 shows another modified embodiment with a bistable mechanism. One or more brake pads 88 are mounted on a plate 96, which again can be flipped between an activated position (solid lines) and a released position (broken lines 94a). It is flipped between these two stable positions by an over-centre mechanism comprising a rotatable wheel 96 and a spring 98. In the activated position, the force of the spring 98 acts on the plate 94 through an arm 100 of the over-centre mechanism, urging the brake pads to brake the motion of the motor rotor 42. In the released position (broken lines), the over-centre mechanism holds the brake pads away from the rotor. The mechanism is flipped between the two positions by a solenoid, not shown, which may be similar to FIGS. 7 and 8, including a fail-safe circuit.

Figure 10:
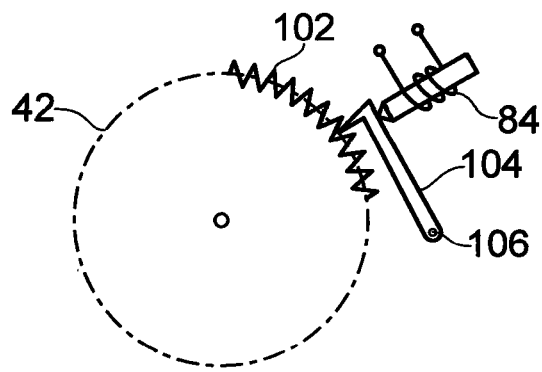

FIG. 10 shows a further bistable embodiment. Here, the motor rotor 42 is provided with a ratchet 102, either on its outer periphery or on an element mounted to the rotor. This cooperates with a pawl 104, hinged about a pivot point 106. In the position shown, the pawl engages with the ratchet, to brake the motion of the rotor. It may be held in this position simply by friction at the hinge pivot point 106. The pawl 104 is moved between activated and released positions by a solenoid coil 84. To release the brake, a transient pulse of current is supplied to the coil, disengaging the pawl from the ratchet. Again, friction at the pivot point holds the pawl in this position. To activate the brake, a transient pulse of current in the opposition direction engages the pawl with the ratchet. The solenoid may be similar to FIGS. 7 and 8, including a fail-safe circuit.

The FIG. 10 embodiment may be modified by providing a pin instead of the pawl, which engages in holes in the rotor periphery instead of a ratchet. Or the holes may be provided on an element mounted to the rotor, or to another movable part of the machine. Or the pin may be mounted to a movable part, engaging holes in a fixed part of the machine. The pawl or pin may be provided with a locking mechanism, activated and released by the solenoid, instead of relying on friction to hold it in the activated and released positions.

Other bistable mechanisms are of course possible. For example a hydraulic mechanism could apply and release brake pads, and could have a solenoid-operated valve or valves to keep it in the activated and released conditions without requiring a continuous current in operation.

A further embodiment of the invention will now be described.

In experiments with the embodiment of FIGS. 2-5, it has been observed that the amount of force available from the electropermanent magnet was reduced when the activation pulse current was reduced. This reduction in magnet force remains constant until the coil is pulsed again either increasing or decreasing the available force. In the further embodiment described below, this property is used to give advanced control over the brake function. In the prior art, an electromagnetic brake system typically is digital, on or off. With the electropermanent brake the force can be set to any point right the way up to saturation.

The maximum field strength from an electropermanent magnet such as shown in FIGS. 2-5 is achieved when there is full polar alignment of the hard (permanent) neodymium magnet 54 and the soft (semi-permanent) AlNiCo magnet 56 (FIG. 4). When the poles are opposed (FIG. 5) the field strength will drop to virtually zero.

Figure 11:
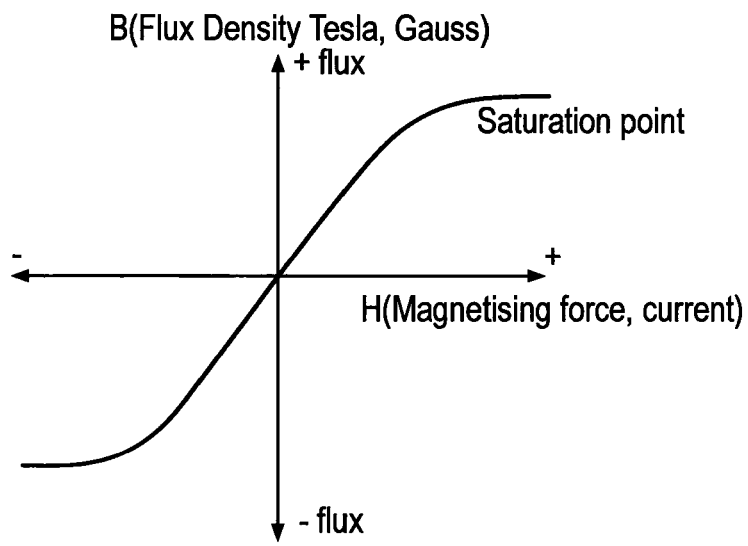
FIG. 11 is graph showing flux density in a soft (semi-permanent) magnet.

FIG. 11 shows a simplified B/H curve of magnetising force vs flux density for the soft magnet by itself. In the electropermanent arrangement of FIGS. 2-5, when the soft magnet passes from the positive flux zone to the negative flux zone, the force from the electropermanent magnet virtually goes to zero. To reduce the force to 50%, in theory the soft magnet would have to be brought to the zero flux point seen in FIG. 11.

Figure 12:
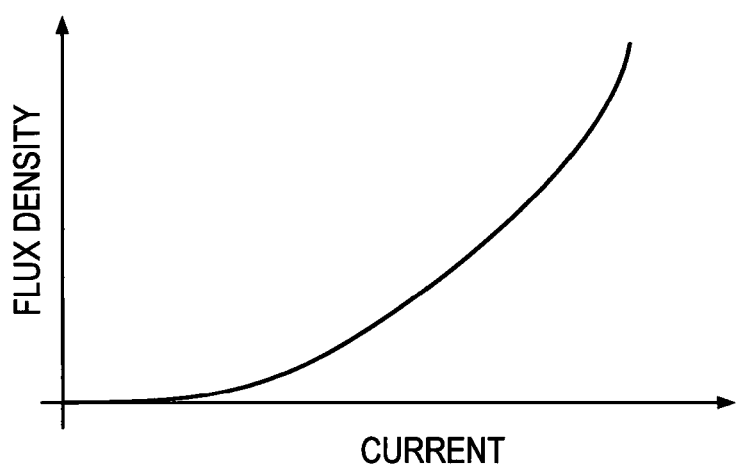
FIG. 12 is a graph showing the flux density in an electropermanent magnet arrangement of FIGS. 2-5.

The B/H curve for an electropermanent magnet is quite different from FIG. 11 because the hard (permanent) magnet is not affected by the magnetic field of the coil 58. FIG. 12 is a graph showing the flux density measured in an electropermanent magnet arrangement such as shown in FIGS. 2-5. Current pulses were applied to the coil of the electropermanent magnet, at a number of different current values.

After each pulse the coil was reset to zero flux density. FIG. 12 is a curve which plots the flux density produced by each specific current pulse value, against the value of the current.

Figure 13A:
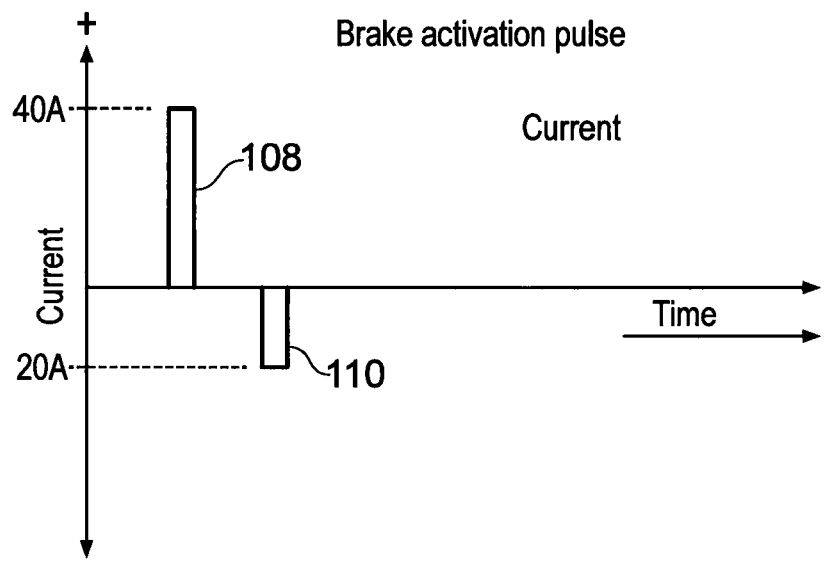
FIGS. 13a and 13b illustrate varying the activation or transient pulse amplitude in an arrangement according to FIGS. 2-5.
Figure 13B:
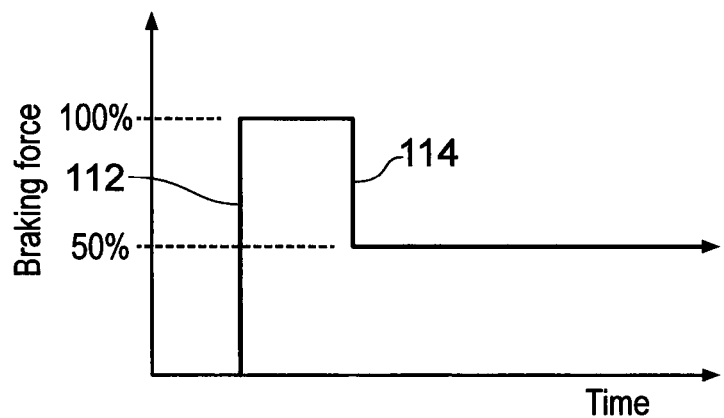

FIGS. 13a and 13b show an example of how varying the transient activation or switching pulse amplitude can give a greater or lesser force from the electropermanent magnet and thus the brake. In FIG. 13a, a first pulse 108 with a current of 40 A is applied in a positive direction, applying the brake with 100% braking force as shown at 112 in FIG. 13b. Subsequently, a second pulse 110 with a smaller current of 20 A is applied in a negative direction. This reduces the braking force to 50% as shown at 114 in FIG. 13b.

This contrasts with the above description of FIGS. 2-5, where the negative and positive pulses have the same current value (amplitude). In that case, the second pulse would reduce the braking force to zero, releasing the brake completely.

By varying the amplitudes of the activation (switching) pulses, it is possible to set the braking force from 0 to 100% on demand. This is a significant advantage over previously-known electromagnetic braking systems.

Figure 14:
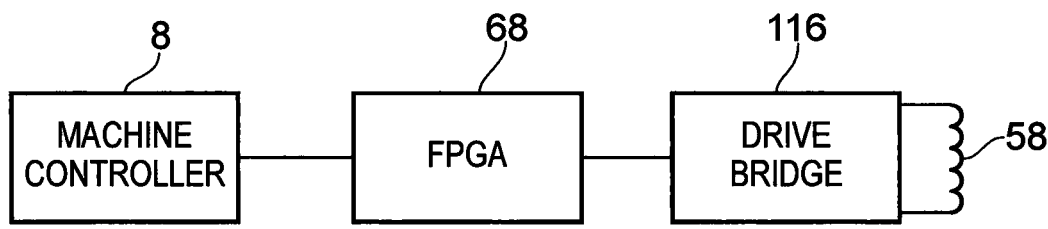
FIG. 14 is a schematic block diagram of an alternative circuit for controlling a braking system.

FIG. 14 is a schematic block diagram of a circuit for generating variable current pulses to implement this embodiment. It may be a modified version of the circuit of FIG. 6. As in FIG. 6, the controller 8 of the machine in FIG. 1 communicates with a programmable controller such as an FPGA 68. This produces signals to control a drive bridge 116, which produces the variable amplitude current pulses (positive and negative) to drive the coil 58 of the electropermanent magnet. The programmable controller 68 is programmed to produce current pulses of any desired amplitude and sign. It may also produce a programmable sequence of such current pulses with varying amplitudes and signs, as required.

In order to produce the current pulses at different positive and negative values, the drive bridge may for example include further drive transistors in addition to the transistors T1-T4 of FIG. 6. These can be switched on as desired to supply current pulses from intermediate voltages or through limiting resistors, depending on the value of current pulse required. Any number of current levels (either positive or negative) may be provided.

Alternatively, the drive bridge 116 may be replaced by a completely variable current pulse generator, which produces current pulses of any desired amplitude and sign, as set by the programmable controller 68.

Varying the available braking force from the electropermanent brake could be used for the following:

Deceleration profiles: For example, a high initial brake force may drop to a lower force, giving maximum deceleration but allowing for back driving.

Uniform reduced brake force: To simplify manufacture, it is possible to manufacture identical brakes which all have high force capabilities. However, on installation or initialisation of the brake, the activation pulse amplitude can then be set in the programmable controller 68 to achieve a specific holding force.

Shipping and installation: It is not always desirable to ship a complete system such as shown in FIG. 1 with the brakes on, as this would hinder unpacking of the system. However, it is advantageous to have some resistance in the system to allow the movable platform 32 to hold position to aid installation. This can be achieved by pre-setting the brake with a desired braking force prior to shipment.

Counterbalance reduced braking requirements: A machine as shown in FIG. 1 may typically include a counterbalance mechanism, to prevent the movable platform 32 sinking under gravity. On installation of the counterbalance the mass at the movable platform will be reduced changing the braking dynamic. Changing the brake force would counter this effect.

In the embodiments described, the braking system has acted directly on the rotor 42 of the motor. Of course, it is possible for it to act on any other moving part of the apparatus or machine which is to be braked, and this part could have either linear or rotary movement.

The invention claimed is:

1. A position determining apparatus comprising a braking system for braking a movable member, the braking system comprising:
   a braking element having an operative braking position in which a braking force is applied to the movable member, and an inoperative position in which the braking force is released; and
   an electro-magnetic device having an electro-magnetic force that acts on the braking element in order to switch between the operative and inoperative positions, the electro-magnetic device comprising:
      at least one active element configured to be energized by a transient pulse of electrical current in order to switch the braking element from the operative braking position to the inoperative position and from the inoperative position to the operative braking position; and
      at least one passive element configured to maintain the braking element in the operative braking position and in the inoperative position after the transient pulse has been removed from the at least one active element, the at least one passive element including a hard permanent magnet and a soft permanent or semi-permanent magnet, the hard magnet and the soft magnet being arranged side-by-side in a parallel arrangement, and the magnetic polarity of the soft magnet being switchable, by applying the transient pulse to the at least one active element, between a state of alignment with and a state of opposition to the magnetic polarity of the hard magnet.

2. The position determining apparatus according to claim 1, further comprising an energy storage device configured to supply the transient pulse to the at least one active element in the event of a power supply failure in order to switch the braking element from the inoperative position to the operative braking position.

3. The position determining apparatus according to claim 2, wherein the energy storage device comprises a capacitor.

4. The position determining apparatus according to claim 1, wherein in the inoperative position, the at least one active element is either not energised or energised by a current which is less than the transient pulse of electrical current.

5. The position determining apparatus according to claim 1, wherein the at least one active element includes an electromagnetic coil associated with the soft permanent magnet.

6. The position determining apparatus according to claim 1, wherein the at least one passive element includes a spring.

7. The position determining apparatus according to claim 1, wherein the electro-magnetic device is bistable or includes a bistable mechanism configured to stabilize the electro-magnetic device in both the operative and inoperative braking positions.

8. The position determining apparatus according to claim 1, further comprising a control device configured to produce the transient pulse and transient pulses of variable amplitude.

9. The position determining apparatus according to claim 8, wherein the control device is programmable to produce a sequence of two or more transient pulses of different amplitudes.

10. The position determining apparatus according to claim 1, wherein the at least one passive element includes a planar spring, with at least one brake pad mounted on a side of the planar spring facing the movable member, wherein the hard magnet, the soft magnet and the at least one active element form a magnet assembly on the opposite side of the planar spring, and wherein when the electro-magnetic force is applied the magnet assembly is pulled towards the movable member, deflecting the planar spring and causing the at least one brake pad to engage frictionally with the movable member to apply a braking force thereto.

11. The position determining apparatus according to claim 1, wherein the at least one active element includes an electromagnetic coil associated with both the hard magnet and the soft magnet, with the hard magnet and the soft magnet being made of different respective magnetic materials such that when the coil is energized by the transient pulse the magnetic polarity of the soft magnet is switched but the magnetic polarity of the hard magnet is not.

12. The position determining apparatus according to claim 11, wherein the hard magnet and the soft magnet are surrounded by the electromagnetic coil.

13. The position determining apparatus according to claim 1, wherein the hard magnet is made of sintered neodymium.

14. The position determining apparatus according to claim 1, wherein the soft magnet is made of an AlNiCo alloy.

15. The position determining apparatus according to claim 1, further comprising a control device that is operable, when the braking element is in the operative braking position, to supply at least one further transient pulse to the at least one active element to vary the braking force applied to the movable member in the operative braking position.

16. A position determining apparatus comprising a braking system for braking a movable member, the braking system comprising:
a braking element having an operative braking position in which a braking force is applied to the movable member, and an inoperative position in which the braking force is released; and
an electro-magnetic device having an electro-magnetic force that acts on the braking element in order to switch between the operative and inoperative positions, the electro-magnetic device comprising:
at least one active element configured to be energized by a transient pulse of electrical current in order to switch the braking element from the operative braking position to the inoperative position and from the inoperative position to the operative braking position; and
at least one passive element configured to maintain the braking element in the operative braking position and in the inoperative position after the transient pulse has been removed from the at least one active element, the at least one passive element including a hard permanent magnet and a soft permanent or semipermanent magnet, and the magnetic polarity of the soft magnet being switchable, by applying the transient pulse to the at least one active element, between a state of alignment with and a state of opposition to the magnetic polarity of the hard magnet,
wherein the at least one passive element includes a planar spring, with at least one brake pad mounted on a side of the planar spring facing the movable member, the hard magnet, the soft magnet and the at least one active element form a magnet assembly on the opposite side of the planar spring, and the electro-magnetic force is applied the magnet assembly is pulled towards the movable member, deflecting the planar spring and causing the at least one brake pad to engage frictionally with the movable member to apply a braking force thereto.

17. A position determining apparatus comprising a braking system for braking a movable member, the braking system comprising:
a braking element having an operative braking position in which a braking force is applied to the movable member, and an inoperative position in which the braking force is released; and
an electro-magnetic device having an electro-magnetic force that acts on the braking element in order to switch between the operative and inoperative positions, the electro-magnetic device comprising:
at least one active element configured to be energized by a transient pulse of electrical current in order to switch the braking element from the operative braking position to the inoperative position and from the inoperative position to the operative braking position; and
at least one passive element configured to maintain the braking element in the operative braking position and in the inoperative position after the transient pulse has been removed from the at least one active element, the at least one passive element including a hard permanent magnet and a soft permanent or semipermanent magnet, and the magnetic polarity of the soft magnet being switchable, by applying the transient pulse to the at least one active element, between a state of alignment with and a state of opposition to the magnetic polarity of the hard magnet,
wherein the at least one active element includes an electromagnetic coil associated with both the hard magnet and the soft magnet, with the hard magnet and the soft magnet being made of different respective magnetic materials such that when the coil is energized by the transient pulse the magnetic polarity of the soft magnet is switched but the magnetic polarity of the hard magnet is not.

18. A position determining apparatus comprising a braking system for braking a movable member, the braking system comprising:
a braking element having an operative braking position in which a braking force is applied to the movable member, and an inoperative position in which the braking force is released;
an electro-magnetic device having an electro-magnetic force that acts on the braking element in order to switch between the operative and inoperative positions, the electro-magnetic device comprising:
at least one active element configured to be energized by a transient pulse of electrical current in order to switch the braking element from the operative braking position to the inoperative position and from the inoperative position to the operative braking position; and at least one passive element configured to maintain the braking element in the operative braking position and in the inoperative position after the transient pulse has been removed from the at least one active element, the at least one passive element including a hard permanent magnet and a soft permanent or semipermanent magnet, and the magnetic polarity of the soft magnet being switchable, by applying the transient pulse to the at least one active element, between a state of alignment with and a state of opposition to the magnetic polarity of the hard magnet; and a control device that is operable, when the braking element is in the operative braking position, to supply at least one further transient pulse to the at least one active element to vary the braking force applied to the movable member in the operative braking position.

* * * * *